Figure 1:
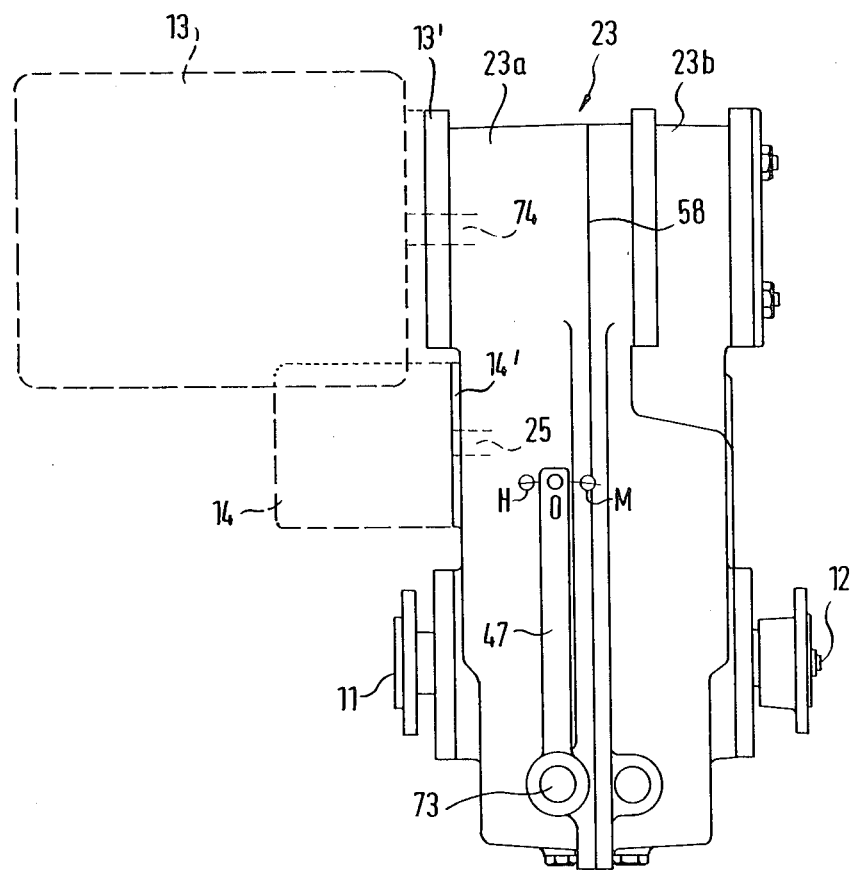

United States Patent [19]

Horn

[11] 4,319,500

[45] Mar. 16, 1982

[54] HYDRO-MECHANICAL CHANGE SPEED MECHANISM

[75] Inventor: Josef Horn, Wernau, Fed. Rep. of Germany

[73] Assignee: Kibo Kommunalmaschinen GmbH & Co. KG, Hohenbrunn, Fed. Rep. of Germany

[21] Appl. No.: 110,630

[22] Filed: Jan. 9, 1980

[30] Foreign Application Priority Data

Jan. 10, 1979 [DE] Fed. Rep. of Germany ....... 2900776

[51] Int. Cl.³ ....................... F16H 47/00; F16H 47/02
[52] U.S. Cl. ....................................... 74/720; 74/655; 74/730; 74/731; 74/358; 74/375
[58] Field of Search ................. 74/655, 720, 730, 731, 74/358, 329, 333, 336 R, 752 A, 356, 357, 363, 369, 375

[56] References Cited

U.S. PATENT DOCUMENTS

| 1,258,143 | 3/1918 | Proctor | 74/375 |
| 1,949,167 | 2/1934 | Maybach | 74/375 |
| 2,729,119 | 1/1956 | Alcock | 74/655 |
| 2,939,328 | 6/1960 | Sinclair | 74/720 X |
| 3,903,756 | 9/1975 | Hamma | 74/720 X |

FOREIGN PATENT DOCUMENTS

| 2455199 | 11/1974 | Fed. Rep. of Germany . | |
| 2757191 | 7/1979 | Fed. Rep. of Germany | 74/720 |
| 2011561 | 7/1979 | United Kingdom | 74/730 |

Primary Examiner—C. J. Husar
Assistant Examiner—Lawrence Gotts

[57] ABSTRACT

A hydro-mechanical change speed mechanism of the type useful in road sweeping vehicles and the like in which the vehicle is required to travel from place to place at normal road speed but also requires the ability to travel at a relatively reduced speed while carrying out its main function such as road sweeping. The change speed mechanism herein disclosed is inserted into the normal drive train so that the input shaft 11 for the mechanism mates with the output shaft from a vehicle gear box and the output drive shaft from the mechanism 12 drives the driven wheels of the vehicle via a cardan shaft. A selector mechanism 41, 42, 43 enables the input and output shafts 11 and 12 to be mechanically directly connected together, or via respective first and second gear trains 15 and 16, to a vehicle drive pump 13 and a hydraulic motor 17 respectively. A hydraulic connection between the vehicle pump and the hydraulic motor results in an alternative hydraulic coupling between the input and output shafts 11 and 12. The first and second gear trains 15 and 16 are displaced to either side of a central longitudinal plane including the axes of the input and output shafts 11 and 12 so that the vehicle drive pump 13 and the hydraulic motor 17 can be accommodated in a place saving arrangement alongside one another. Further drives are available for auxiliary equipment 40, 30. The arrangement also features a novel housing arrangement and novel selector mechanism.

32 Claims, 11 Drawing Figures

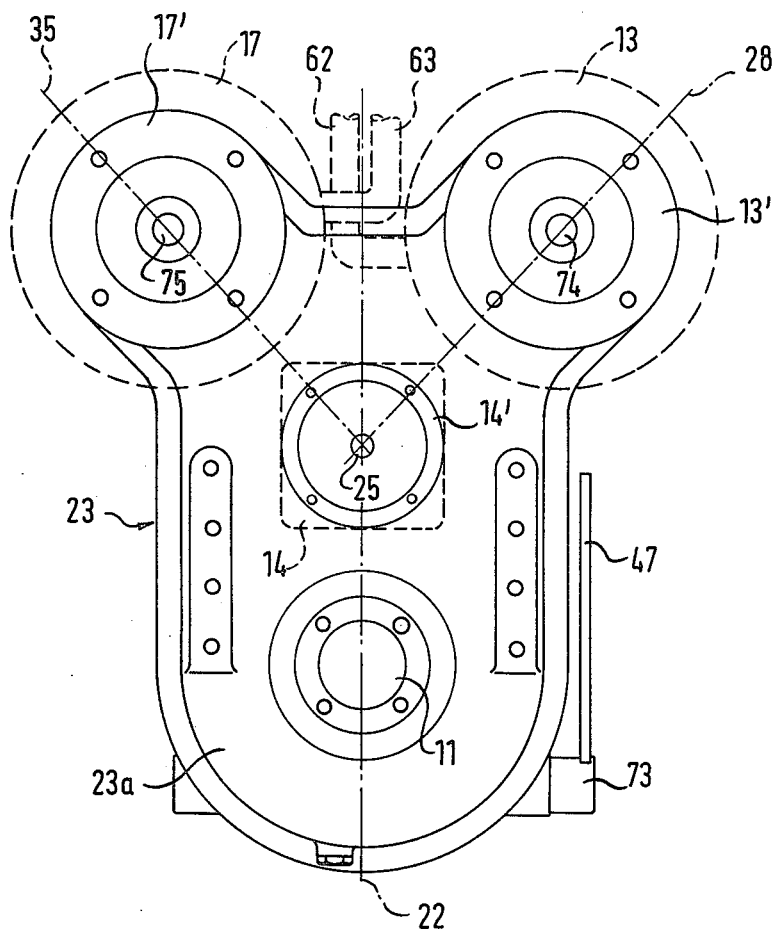
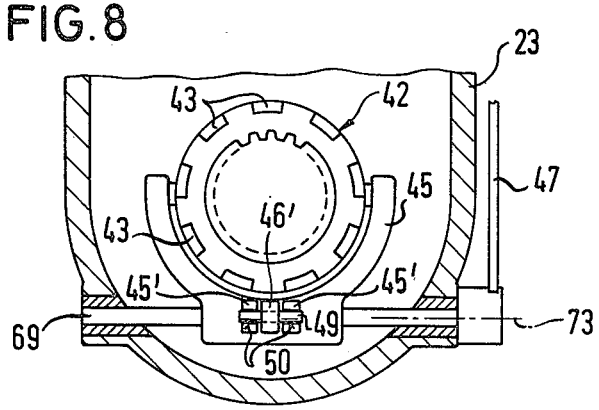

HYDRO-MECHANICAL CHANGE SPEED MECHANISM

The invention relates to a hydro-mechanical change speed mechanism in particular for a vehicle adapted to drive associated apparatus whilst travelling at a relatively reduced speed such as a road sweeping vehicle.

Change speed mechanisms of this kind are useful for road sweeping vehicles or similar types of machines such as grass cutters or harvesters which need to travel from place to place at relatively higher road speeds and to be able to creep forward at lower speeds whilst performing their sweeping, cutting or harvesting functions. This is achieved by inserting a change speed mechanism into the normal drive train of the vehicle so that when the mechanism is disengaged normal vehicle operation can take place using the customary vehicle gear box whilst, for example during sweeping operation, the change speed mechanism is coupled into the normal drive train so that sweeping can be carried out in any one of the gears of the normal vehicle drive but with an additional reduction through the change speed mechanism. In addition at least one additional drive is taken from the change speed mechanism for driving the associated sweeping apparatus.

Suitable change speed mechanisms are of the hydromechanical kind and feature a mechanical gear transmission which drives a vehicle drive pump which can itself be controlled to control the velocity of the vehicle and which itself drives a hydraulic hydrostatic motor which is coupled back to the output of the change speed mechanism. The hydrostatic hydraulic motor can itself likewise be controllable if desired. The overall reduction of the change speed mechanism thus enables the vehicle to creep forwardly during sweeping operation. Further pumps for the drive of the associated sweeping apparatus and a blower can be connected to the change speed mechanism. The blower serves to produce an air stream which sucks the sweepings from the brooms into the collection tank.

A mechanical/hydrostatic change speed mechanism of this kind is known for example from DE-AS No. 24 55 199 which is also assigned to the assignees in respect to the present invention. As a change speed mechanism of this kind forms a piece of supplementary equipment it is important to construct the equipment so that it can be accommodated on a vehicle chassis with as great an economy of space as is possible.

The present invention thus starts from a known hydrostatic mechanical change speed mechanism for a vehicle adapted to drive associated apparatus whilst travelling at a relatively reduced speed such as a road sweeping vehicle. The mechanism features an input shaft drivable from the vehicle motor via the normal mechanical vehicle drive, an output shaft which is adapted to drive the vehicle wheels, either directly or indirectly, and which is axially aligned with the input shaft there being means actuated by a driver control selector mechanism for selectively coupling the output shaft to, or decoupling the output shaft from, the input shaft. A first gear train comprised only of gears with axes lying parallel to the input shaft and generally in a plane at right angles thereto can be connected to the input shaft when the output shaft is decoupled and is adapted to drive a vehicle drive pump and a drive for the associated apparatus. A second gear train comprised only of gears with their axes lying parallel to the axis of the input shaft and generally within a second plane arranged behind and parallel to the plane of the first gear train is connectable with the output shaft when the input shaft is decoupled and is driven via a hydraulic hydrostatic motor which is connected to the vehicle drive pump.

It is a first principal object of the present invention to provide a hydro-mechanical change speed mechanism of this kind which is of especially compact construction, can be accommodated in a customary vehicle chassis with great economy of space and the dimensions of which in the longitudinal direction of the vehicle are as small as possible.

For accomplishing this object the invention envisages that the drive gears of the first and second gear trains, which are coupled with the vehicle drive pump and the hydraulic motor respectively, are displaced to either side of the central longitudinal plane of the mechanism by a distance sufficient that the vehicle drive pump and the hydraulic motor can be connected by flanges on the same side of a housing containing said first and second gear trains. The vehicle drive pump and the hydraulic motor are preferably connected by flanges on the input shaft side of said housing.

As a result of this construction the lower part of the change speed mechanism fits comfortably between the two side members of a customary truck chassis whilst solely the upper part of the mechanism which carries the vehicle drive pump and the hydraulic motor project sideways rather more and are located above the side members of the vehicle chassis. The arrangement of the vehicle drive pump and of the hydraulic motor on the same side of the change speed mechanism considerably reduces the dimension of the change speed mechanism in the longitudinal direction.

It is particularly advantageous if the flanges for the vehicle drive pump and for the hydraulic motor are respectively arranged at the same height and at the same distance from the central longitudinal plane of the mechanism which conveniently coincides with the central longitudinal plane of the vehicle. This arrangement results in a uniform utilization of space and makes possible the symmetrical construction of the housing halves about the central longitudinal plane as will be later described.

An especially advantageous embodiment is characterized in that the first gear train comprises a first transfer gear concentrically and freely rotatably mounted on the input shaft, means for coupling the transfer gear to said input shaft, a first intermediate gear meshing with the first transfer gear and supported on a first intermediate shaft for rotation together therewith and further means for driving the vehicle pump from the first intermediate gear. In this arrangement the first intermediate shaft is conveniently located above the input shaft. At the output side of the change speed mechanism there is conveniently provided a similar arrangement in which the second gear train comprises a second transfer gear freely rotatably mounted about the output shaft, means for coupling the second output gear to the output shaft for rotation together therewith, a second intermediate gear meshing with the second transfer gear and supported on a second intermediate shaft for rotation together therewith and means for driving the second intermediate gear from the hydraulic motor. The second intermediate shaft is preferably axially directly aligned with the first intermediate shaft. In both arrangements further intermediate gears can be respectively provided on the first and second intermediate shafts in the drives from the first and second intermediate gears to the vehicle drive pump and the hydraulic motor respectively.

In this way the vehicle drive pump and the hydraulic motor can be arranged significantly higher than and thus above the side members of the vehicle chassis. Above all however, this embodiment makes it possible for the first intermediate shaft to drive a sweep or accessory drive pump flanged to the front of the housing. This pump has however a sufficiently small spatial extent that it can also be arranged in the region of the side members of the vehicle chassis, i.e. between them on the change speed mechanism.

It is particularly advantageous if the first gear train comprises in addition to the drive gear for the vehicle drive pump at least one idler gear meshing with this drive gear with the idler gear being driven either directly or indirectly in the first intermediate gear and if the drive gear for the vehicle pump and the idler gear lie on a line subtending an angle $\alpha$ in the range from 20° to 70° with the central longitudinal plane. The angle $\alpha$ preferably lies in the range from 30° to 60° and in a particularly preferred embodiment amounts to substantially 45°. The second gear train is conveniently laid out in similar fashion and is characterized in that the means for driving the second intermediate gear from the hydraulic motor comprises, in addition to the drive gear coupled to the hydraulic motor, a second idler gear meshing therewith and in that the second idler gear and the drive gear coupled to the hydraulic motor lie along a line which subtends an angle $\beta$ in the range from 20° to 70° with the central longitudinal plane. As before this angle preferably lies in the range from 30° to 60° and in a particularly preferred embodiment is substantially 45°. It is clearly convenient if the angle $\alpha$ is chosen to equal the angle $\beta$.

In these embodiments the first and second gear trains branch at the angles $\alpha$ and $\beta$ away from the common axis of the first and second intermediate shafts at the above mentioned preferred angles. This arrangement ensures the necessary sideways separation to allow the vehicle drive pump and the hydraulic motor to be arranged alongside each other. The layout of the first and second gear trains i.e. the arrangement of gears, one above the other in the lower region of the change speed mechanism and the inclined arrangement in the upper region of the gear mechanism results in a compact construction which is particularly suitable for mounting in the vehicle chassis.

For an exact symmetrical arrangement on both sides of the central longitudinal plane it is important that the two angles $\alpha$ and $\beta$ are opposed to each other and of the same magnitude.

It is useful, for the subsequently to be described identical construction of the housing halves and for cost effective manufacture, if, in said first gear train, the drive gear for the vehicle drive pump and the meshing first idler gear respectively have the same divisions as the drive gear coupled with the hydraulic motor and the meshing second idler gear of the second gear train.

It is particularly advantageous if the drive gear for the vehicle drive pump also drives a further pump for auxiliary equipment with the further pump being located on the opposite side of the drive gear from, and coaxial with, the vehicle drive pump. The further pump is conveniently flanged to the opposite side of the housing and in a road sweeping machine is usefully used to drive the blower. The blower drive pump is thus accommodated without significant constructional trouble or expense and in a manner very economical of space.

A further principal object of the invention is to provide a compact and operationally reliable mechanism for selectively coupling between the input shaft and the output shaft, or between the shaft and the drive for the vehicle wheels, and which is not sensitive to wear.

A particularly compact construction in accordance with the invention and which accomplishes the above-mentioned object is characterized in that the first and second gear trains include respective first and second transfer gears respectively freely rotatably mounted on the input and output shafts, with first and second coupling gears respectively coaxially fixed to the first and second transfer gears for rotation together therewith, the first and second coupling gears being axially aligned with respective input and output gears of the same diameter and the same tooth division, said input and output gears being fixed to the input and output shafts respectively, being spaced apart by a small axial distance and respectively supporting axially displaceable first and second selector hubs, the first and second selector hubs having matching dogs on their end faces and the selector mechanism being operative to displace the selector hubs to respective first end positions, for respectively coupling the input and output gears with the first and second coupling gears of the associated first and second transfer gears, and to second end positions in which the matching dogs are engaged for effecting a drive connection between the input and output shafts.

The selector mechanism is preferably adapted to jointly displace the first and second selector hubs to the first end positions and to the second end positions.

During mechanical drive the input and output shafts are thus rotationally connected together via the dogs of the first and second selector hubs. In contrast, during hydrostatic operation, inner toothed rings of the first and second selector hubs respectively rotationally connect the input and output shafts with their respective first and second gear trains. An advantageous practical embodiment of the invention is characterized in that the first and second selector hubs are respectively pivotally connected to first and second actuating levers with the first and second actuating levers being pivotally connected to the housing and to one another such that they move necessity in opposite directions. If one of the actuating levers is now rotationally connected to an actuating rod located outside of the housing then the change over from hydrostatic to mechanical drive and reverse can be completed by actuating movement of this single rod.

An abutment ring is advantageously arranged between the input and output gears and projects radially beyond the gears to form, at its end faces, respective abutments for the first and second selector hubs. The ring however nevertheless allows the end face dogs of the selector hubs to engage one another. The movement of the selector hubs towards one another is thus limited by this abutment ring and defines the second end positions therefor.

The actuating levers are preferably constructed as selector forks embracing the selector hubs.

A further thought underlying the invention is that the change over from mechanical drive to hydrostatic drive and vice versa should only be able to take place when the input and output shafts are stationary and indeed without the operator having to pay particular attention.

For this purpose, and in accordance with a specially preferred embodiment of the invention, there is provided a releasable stop for fixing the first and second actuating levers in their positions corresponding to the first and second end positions of the first and second selector hubs. The stop is operative when the input and output shafts are in rotation but is disengaged when the input and output shafts are stationary. By way of example the stop arrangement can comprise a pump actuated by the input and output shafts the pressure of which actuates a stop lever so that change of the change speed mechanism from mechanical to hydraulic drive is not possible. When the shafts are stationary the pump pressure disappears and the stop is disengaged. Further constructions of the stop using electric or magnetic means can be conceived in which no signal is present when the shafts are stationary so that the stop is disengaged, but in which an electrical voltage is generated when the shafts are rotating which causes or allows the stop to engage.

A further principal object of the invention is to provide a change speed mechanism of the previously named general kind which can be particularly economically produced by the multiple utilization of the parts that have to be manufactured.

Thus for this purpose and in accordance with the invention it is envisaged that the mechanism includes a gear housing containing said first and second gear trains and that said housing comprises two substantially identical first and second housing halves which are placed together in opposition along a plane extending at right angles to the input and output shafts. In this way it is only necessary to manufacture a single type of housing half for example by casting and subsequent machining, in order to produce a housing for the mechanism of the invention from two such halves. In this way the storing of spare parts is also simplified.

It is especially advantageous if the first and second housing halves are each symmetrically constructed with respect to the central longitudinal plane of the mechanism. The first and second housing halves should be substantially identically constructed in the vicinity of the input and output shafts on both sides of the central longitudinal axis. In the vicinity of the drives for the vehicle drive pump and the hydraulic motor the two housing halves are however preferably dissimilarly constructed such that the flange for the vehicle drive pump projects further forwards with respect to the axis of this pump than the flange for the hydraulic motor. This arrangement is not only useful in producing a construction which is economical of space but also makes it possible for the hydraulic connections for the vehicle drive pump and the hydraulic motor to be axially displaced so that they have room to overlap between these two components. The axial displacement of the two flanges is also advantageous for the space saving accommodation of the blower drive pump.

Whilst the gears in the upper region of the mechanism can easily be journalled on both sides in the housing because of their sideways displacement this is not possible for the axially aligned intermediate shafts. In order therefore to make it possible to support the intermediate shafts at both sides an advantageous embodiment of the invention envisages that a bearing plate is provided to rotatably support the inner ends of the first and second intermediate shafts and that this bearing plate is adapted to be located between the housing halves. The arrangement is conveniently such that the bearing plate can be introduced into the open side of one of the housing halves and can be fastened thereto without preventing fitting of the other of the housing halves. This can for example be achieved by a mirror image arrangement relative to the central longitudinal axis, and to the transverse axis, of depressions and raised portions on the housing halves and the bearing plate.

Figure 2:
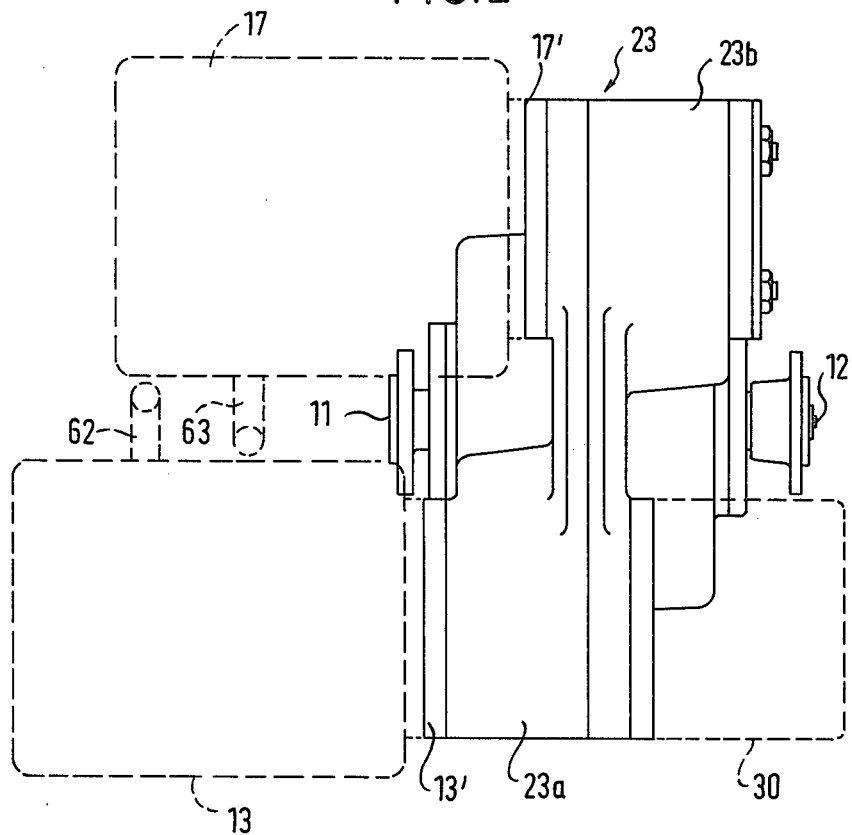
Figure 9:
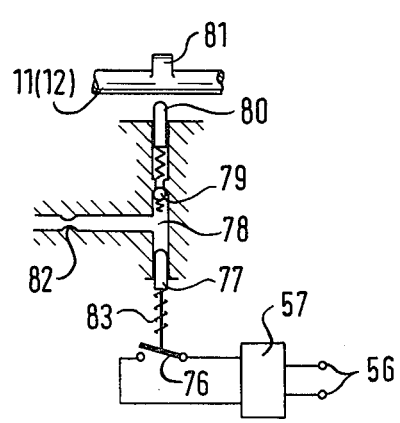
Figure 10:
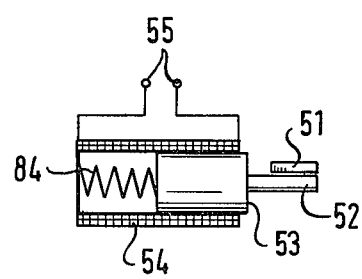
Figure 4:
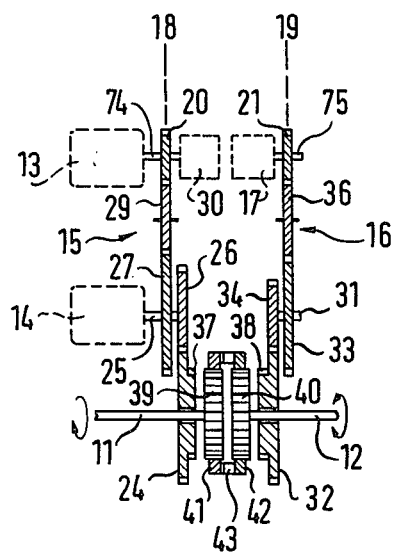
Figure 5:
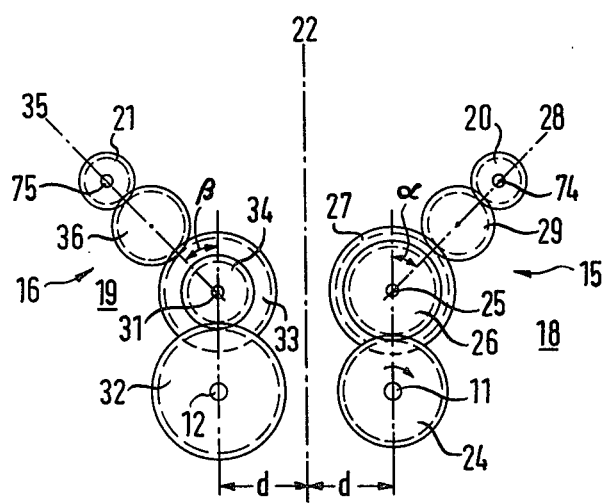
Figure 6:
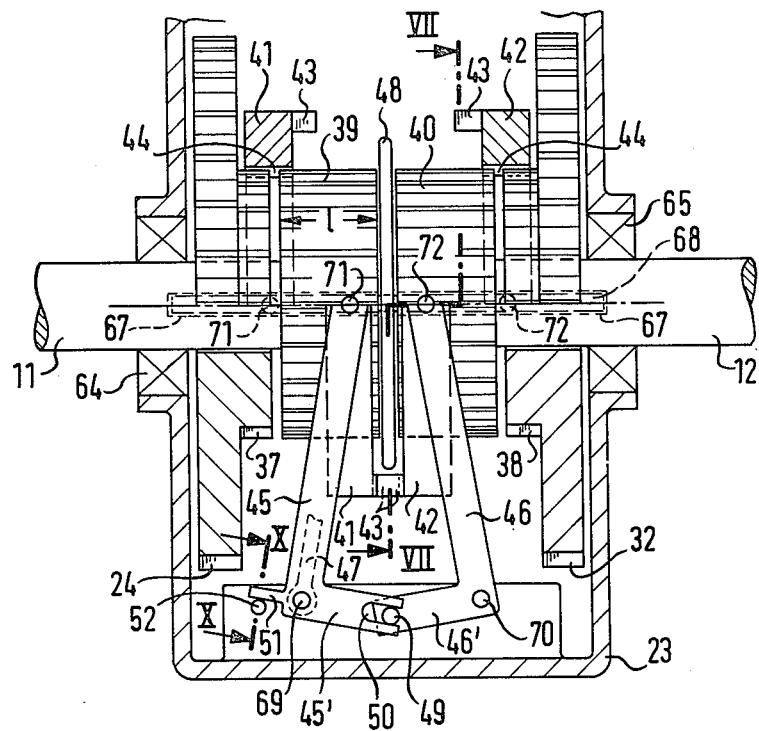
Figure 7:
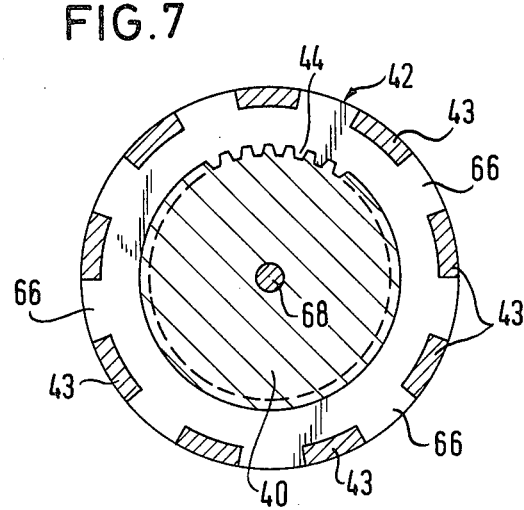
Figure 11:
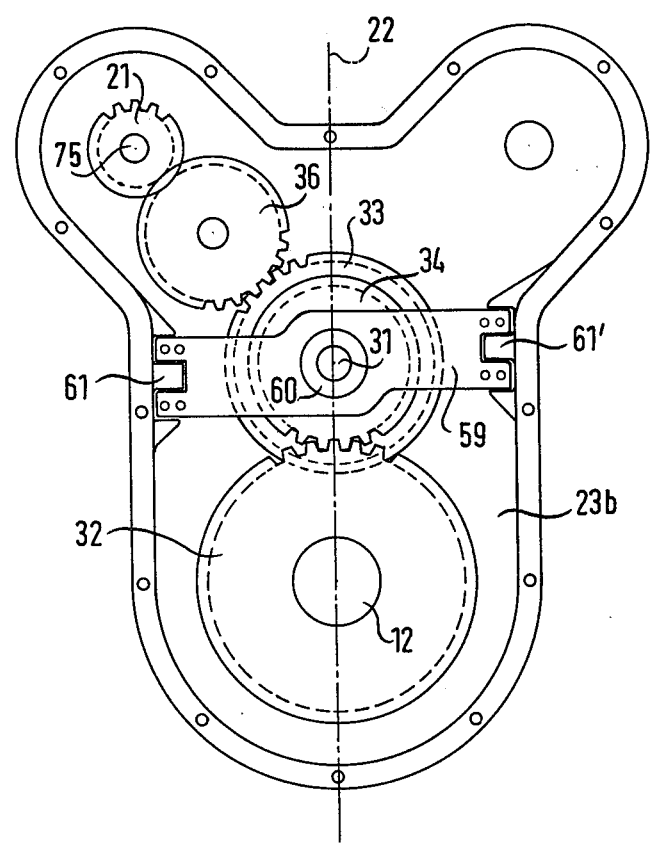

The invention will now be described in further detail by way of example only and with reference to the accompanying drawings in which are shown:

FIG. 1 a side view of a change speed mechanism in accordance with the invention, FIG. 2 a plan view of the subject of FIG. 1, FIG. 3 a front view of the subject of FIG. 1, FIG. 4 a schematic side view of the inner construction of the mechanism, FIG. 5 a schematic developed front view of the internal construction of the change speed mechanism illustrating the arrangement of the two associated gear trains with the gear trains illustrated displaced sideways by a distance d on either side of the central longitudinal axis and with the planes of the gear trains folded through 90°, FIG. 6 a partially sectioned enlarged side view of a section of the change speed mechanism in the region of the input and output shafts, FIG. 7 a sectional view on the line VII—VII of FIG. 6, FIG. 8 a view of a selector hub and of the associated actuating lever as seen in the axial direction thereof, FIG. 9 a schematic side view of a sensor for determining whether a shaft turns or not, FIG. 10 a view on the line X—X of FIG. 6 to illustrate the manner of operation of a stop for the actuating lever and FIG. 11 a plan view of one half of a housing for the mechanism, in particular the rear half, showing the location of a bearing plate.

Turning now to FIGS. 1 to 6 there can be seen a hydromechanical change speed mechanism incorporating mechanical gear components and hydrostatic pumps and drives. The change speed mechanism features a housing 23 which is narrower at its lower region than at its upper region, where, as can be seen particularly clearly from FIG. 3, it widens in the manner shown to accommodate flanges 13′ and 17′ for a vehicle drive pump 13 and a hydraulic hydrostatic motor 17 respectively. An input shaft 11 driven in conventional fashion from the gear box of the vehicle engine (not shown) enters through a bearing 64 (FIG. 6) from the front into the lower part of the housing 23 and finishes in an input gear 39 which is fastened to the shaft for rotation together therewith. Directly opposite to the input gear 39 there is located, at a small distance, an identically constructed output gear 40 at the end of an output shaft 12 which enters the housing 23 from the rear via a bearing 65.

In a manner not shown, but well understood by those skilled in the art, the input shaft 11 is connected with the output shaft of a normal vehicle gear box whilst the output shaft 12 is connected to the cardan shaft which leads to the driven wheels of the vehicle.

As seen in FIGS. 4 and 6 first and second, input and output, transfer gears are supported on the input shaft 11 and the output shaft 12 respectively. The first and second transfer gears 24, 32 carry coaxially arranged, first and second coupling gears 37, 38 which face towards the interior of the mechanism and which have the same diameter and the same tooth division as the input and output gears 39, 40. The first and second coupling gears 37, 38 are spaced by only a small distance from the respectively associated input and output gears 39, 40.

First and second selector hubs 41, 42 sit respectively one on each of the input and output gears in order to respectively connect the latter either together or to their respectively associated first and second transfer gears via the first and second coupling gears. For this purpose the selector hubs 41, 42 each carry an inner ring of teeth 44 (FIG. 6) which are able to mesh with the teeth of the input and output gears 39, 40 and with the first and second coupling gears 37, 38. Thus by moving the first and second selector hubs apart from each other to the position shown in FIG. 6 a drive can be established between the input gear 39 and the associated first transfer gear 24 and between the second transfer gear 32 and the output gear 40. The first and second selector hubs 41, 42 are also provided with axially projecting matching dogs or sprags 43 at their facing end faces with cut outs 66 between the individual dogs or sprags. In this way, by moving the selector hubs 41 and 42 into the position shown in dotted lines in the lower of FIG. 6, it is possible to directly couple the input gear 39 to the output gear 40 via the dogged connection.

The opposing end faces of the axially aligned input and output shafts 11 and 12 have coaxial hollow spaces 67 in which a bearing bar 68 is located which supports the shafts 11 and 12 during rotational movement thereof and in addition supports an abutment ring 48 arranged between the input and output gears 39, 40. This abutment ring 48 extends radially beyond the input and output gears 39, 40 until approximately the inner radius of the matching dogs 43.

The axial extent of the selector hubs 41, 42 is somewhat less than the axial extent 1 (FIG. 6) of the input and output gears 39 and 40.

Whilst in the lower half of FIG. 6 the first and second selector hubs 41, 42 are illustrated in their inner end position, in which the dogs 43 of the one selector hub engage in the cut outs 66 of the other selector hub in order to produce a rotationally locked connection between the input and output shafts 11 and 12, they are shown in the upper half of FIG. 6 in their outer end positions in which they connect the input and output gears 39, 40 with the associated coupling gears 37, 38 via the inner rings of teeth 44.

The axial displacement of the selector hubs 41, 42 between the two end positions takes place as can be seen from FIGS. 1, 6 and 8 by respective forked levers, or selector forks 45, 46 which are pivotally journalled at 69, 70 to the housing 23 about axes which extend at right angles to the direction of movement of the first and second selector hubs. The first and second selector hubs 41 and 42 are connected to the fork levers 45, 46 at 71, 72 so that they can rotate relative thereto but leaving a degree of play in the longitudinal direction of the fork levers. This connection can conveniently take the form of pegs provided fork levers which engage in annular grooves in the outer peripheral surface of the coupling rings.

The actuating fork levers 45, 46 are bent inwardly at right angles at the pivot axes 69, 70 and egage together via a transverse pin 49 on the lever arm 46' and an elongate slot 50 on the lever arm 45' in such a way that they can only be moved synchronously in opposite directions and can thus only move the coupling rings 41, 42 synchronously between opposite end positions.

The pivot axle 73 of the actuating lever 45 passes out of the housing 23 (as can be seen in FIG. 8) and is there connected with an actuating rod 47 which is also shown in broken lines in FIG. 6 and in full lines in FIG. 1.

In accordance with the invention the input shaft 11 is connected neither with the output shaft 12 nor with the first transfer gear 24 when the actuating rod 47 is in its central position which can be seen from FIG. 1. The same applies for the output shaft 12.

By moving the actuating rod 47 to the position M of FIG. 1 the change speed mechanism is switched such that the two selector hubs are brought into engagement as shown in the lower half of FIG. 6. If the actuating rod 47 is moved in accordance with FIG. 1 to the position H then the input and output shafts 11 and 12 are mechanically decoupled, and the first and second selector hubs are moved to the position shown in the upper half of FIG. 6 which results in the output shaft 12 being coupled to the input shaft 11 via the hydrostatic drive as will be later explained.

As can be seen on FIGS. 1 to 5 first and second intermediate shafts 25, 31 are arranged axially aligned one behind the other directly above the input and output shafts 11, 12 and are respectively freely rotatably journalled in the housing 23. The front most, first, intermediate shaft 25 carries a first intermediate gear 26 with for example 48 teeth which meshes with the first transfer gear 24 which is freely rotatably arranged on the input shaft 11 and has for example 56 teeth. A further intermediate gear 27 having for example 49 teeth is also arranged on the first intermediate shaft 25 coaxial to the first intermediate gear 26.

As can thus be seen from FIGS. 3 and 5 the drive from the first intermediate gear 26 is passed via the shaft 25, the further intermediate gear 27 and an idler gear 29 to a gear 20 arranged to drive the vehicle drive pump 13. The idler gear 29 can conveniently have 33 teeth which mesh with the 49 teeth of the further intermediate gear 27 and the 20 teeth of the drive gear 20 for the vehicle drive pump. The idler gear 29 and the drive gear 20 are arranged one behind the other along a line 28 which subtends an included angle α of substantially 45° to the central longitudinal plane 22. This arrangement allows the vehicle drive pump 13 with which the drive gear 20 is connected via the shaft 74 to be connected to the housing 23 at the flange 13' at a position displaced sideways from the central longitudinal plane.

On rotating the input gear 24 in the clockwise direction the vehicle drive pump 13 is accordingly driven in the counter clockwise direction.

The gears of the first gear train comprised by the first transfer gear 24, the first intermediate gear 26, the further intermediate gear 27, the idler gear 29 and the drive gear 20 is thus constituted only of gears with their axes lying parallel to the axis of the input shaft and generally within a first plane 18 which lies at the front end of the change speed mechanism.

To the right hand side of FIG. 5 there can be seen a second gear train 16 which is similarly constructed to the first gear train 15 but which can have a different ratio in the manner illustrated in FIG. 5.

Thus the second gear train 16 comprises a second transfer wheel 32, having for example 73 teeth, which is freely rotatably mounted on the output shaft 12 and which meshes with a second intermediate gear 34, having for example 31 teeth, and which is mounted on the second intermediate shaft 31 for rotation together therewith. As previously mentioned the second intermediate shaft 31 is axially aligned with the first intermediate shaft 25 but is however freely independently rotatable relative thereto. A further intermediate gear 33 having for example 49 teeth is also rotatably fixed to the second intermediate shaft 31.

This further intermediate gear 33 meshes via a second idler gear 36 with the drive gear 21 which is coupled via the shaft 75 to the hydraulic hydrostatic motor 17 which is connected via a flange 17' to the housing 23 on the same side as the vehicle drive pump 13. In similar fashion to the first gear train the drive gear coupled to the hydrostatic motor 17 and the meshing second idler gear 36 have their axes located on a line 35 which extends at an angle β of substantially 45° with the central longitudinal plane 22. In this manner the mounting flange 17' for the hydraulic motor 17 can conveniently be placed alongside the vehicle drive pump 13. The vehicle drive pump 13 and the hydraulic motor 17 are thus attached, at the same height and at the same sideways spacing from the central longitudinal plane 22, to the front side of the housing 23. This arrangement being made possible by the divergent arrangement of the gear trains represented by the angles α and β. The angles α and β should normally lie between 20° and 70°, preferably between 30° and 60° and the most preferred embodiment as here illustrated should equal 45°. It will be seen from FIGS. 4 and 5 that the gears of the second gear train thus lie generally in a plane 19 parallel to and behind the plane 18 of the gears of the first gear train and have their axes arranged parallel to one another and to the input shaft 11.

As can be seen from FIGS. 2 and 4 the drive pump 30 for the blower of the sweeping machine is flanged to the rear side of the housing 23 and is driven by an extension of the drive shaft 74 for the vehicle drive pump. The blower drive pump 30 serves to pressurize a hydraulic (hydrostatic) motor which sets in rotation the suction blower at the container for collecting sweepings.

The second idler gear 36 and the drive gear 21 which is coupled to the hydraulic motor 17 have 33 and 20 teeth respectively in the same manner as the first idler gear 29 and the drive gear 20 for the vehicle drive pump.

As can be seen from FIG. 5 the transmission ratio of the first and second gear trains 15 and 16 can be changed in simple manner without changing the position of the individual pivot axles by simply changing the ratios of the tooth divisions of the individual gear wheels 32, 34 and 24, 26 respectively.

Turning now to FIGS. 6, 9 and 10 there can be seen an arrangement which allows the selector lever mechanism (45, 46 for example) to be locked in either of its end positions. The device features a spring loaded pin 52 which can engage with a projection 51 which projects in the manner shown in FIG. 6 from the actuating lever 45.

The pin 52 is connected with an armature 53 of a magnetic coil 54 which is connectable via terminals 55 to the terminals 56 of a control device 57 (FIG. 9). In the input circuit of the control device 57 there is located a switch 76 which can be closed by a pressure actuated piston 77. On closing of the switch 77 the electromagnet 54 is supplied with current and the armature 53 draws the pin 52 out of engagement with the lever 51 so that the actuating levers 45, 46 can be switched over from one end position via the intermediate position to the other end position. A pressure can be generated in the pressure chamber 78 in front of the piston 77, for example by means of periodic engagement of a projection 81 on the input shaft 11 and/or the output shaft 12, which periodically actuates the spring loaded piston 80 which pressurizes the pressure chambers 78 via a non-return valve 79. A restrictor 82 ensures that the pressure in the pressure chambers 78 is maintained at least between each pair of successive strokes of the piston 80 by the projection 81.

If the shaft 11 or 12 is stationary then the pressure in the pressure chamber 78 gradually disappears and a spring 83 can push the piston 77 into the pressure chamber 78 so that the switch 76 opens and a spring 84 (FIG. 10) brings the pin 52 into blocking engagement with the projection 51 on the actuating lever 45.

The above described blocking arrangement is merely by way of example. It will be appreciated that the described lock arrangement can be replaced by any other desired arrangement featuring devices responsible to the speed of the input and/or output shaft 12 and corresponding control devices. It is important that the lock arrangement chosen is as simple and inexpensive as is possible without sacrifizing reliability. The above described arrangement has these attributes.

As can be seen from FIGS. 1 to 3 and 11 the housing of the change speed mechanism is constructed of two identical, first and second housing halves 23a, 23b which are placed together in opposition, along a plane 58 extending at right angles to the input and output shafts. Each of the housing halves 23a and 23b is moreover symmetrically constructed with respect to the central longitudinal plane 22 of the mechanism. In accordance with the invention the flanges 13', 17' are however so mutually displaced in the axial direction, i.e. in the direction of the axis of the vehicle drive pump, that the hydraulic connections 62, 63 of the vehicle drive pump 13 and of the hydraulic motor 17 are axially mutually displaced in the manner which can be seen from FIG. 2. This arrangement is made possible by the placing of the first and second gear trains 15, 16 in the spaced apart planes 18, 19.

In order to be able to rigidly journal the inner ends of the intermediate shafts 25 and 31 on the housing 23 there is provided a specially supported bearing plate 59 which can be seen from FIG. 11. The bearing plate 59 supports the bearings 60 for the inner ends of the intermediate shafts 25, 31. The bearing plate 59 is accommodated at its side edges by oppositely disposed mounts 61 and indeed in such a way that after inserting and fastening the bearing plate 59 for example in one housing half 23b, the other identically constructed housing half 23a can be positioned without hinderance in a position rotated through 180° relative to the housing half 23b. For this purpose vertically displaced projections and cut outs are provided on diametrically opposite sides of the housing, i.e. to either side of the central longitudinal plane 22. Correspondingly vertically displaced projections and cut outs of the bearing plate engage with these cut outs and projections on the housing. The projections and cut outs are arranged in mirror image symmetry about the central longitudinal axis or plane 22 and are moreover so arranged that on placing the two housing halves together a projection of the mount 61 in the one housing half lies over a depression in the mount 61' of the other housing half and vice versa.

It will be appreciated by those skilled in the art that the afore-mentioned change speed mechanism can conveniently be located in a vehicle chassis frame with the central longitudinal plane of the mechanism, i.e. the central plane coincident with the axis of the shafts 11 and 12, coincident with the central longitudinal axis of the vehicle chassis.

It will also be readily understood that the change speed mechanism is also particularly suited to use in other vehicles such as refuse collection trucks which also need to creep forward slowly whilst performing an auxiliary function.

I claim:

1. A hydro-mechanical change speed mechanism in particular for a vehicle driving an associated apparatus whilst travelling at a relatively reduced speed, such as a road sweeping vehicle, the mechanism featuring an input shaft drivable from the vehicle motor via a mechanical vehicle drive, an output shaft which is adapted to drive the vehicle wheels, said output shaft being axially aligned with said input shaft, means actuated by a driver controlled selector mechanism for selectively coupling in direct drive said output shaft to, or decoupling said output shaft from, said input shaft, a first gear train comprised only of gears with axes lying parallel to said input shaft and generally in a plane at right angles to said input shaft, said first gear train being connectable with said input shaft when the output shaft is decoupled and being in driving arrangement with a vehicle drive pump and the associated apparatus and a second gear train comprised only of gears with their axes lying parallel to the axis of said input shaft and generally within a second plane arranged behind and parallel to the plane of the first said gear train, said second gear train being connectable with the output shaft when the input shaft is decoupled from said output shaft and being drivable via a hydraulic motor which is connected to said vehicle drive pump said first and second gear trains being decoupled from their respective input and output shafts when said input shaft and said output shaft are coupled, the mechanism being characterized in that the drive gears of the first and second gear trains which are coupled with the vehicle drive pump and the hydraulic motor respectively are displaced to either side of a central longitudinal plane through said input axis of the mechanism by a distance sufficient that the vehicle drive pump and the hydraulic motor are connected by flanges on the same side of a housing containing said first and second gear trains.

2. A hydro-mechanical change speed mechanism in accordance with claim 1 and characterized in that the vehicle drive pump and the hydraulic motor are connected by flanges on the input shaft side of said housing.

3. A hydro-mechanical change speed mechanism in accordance with claim 1 and characterized in that the flanges for the vehicle drive pump and for the hydraulic motor are respectively arranged at the same height and at the same distance from said central longitudinal plane.

4. A hydro-mechanical change speed mechanism in accordance with claim 1 and characterized in that said first gear train comprises a first transfer gear concentrically and freely rotatably mounted on the input shaft, means for coupling said first transfer gear to said input shaft, a first intermediate gear meshing with said first transfer gear and supported on a first intermediate shaft for rotation together therewith, said first gear train further comprising means for driving the vehicle drive pump from said first intermediate gear.

5. A hydro-mechanical change speed mechanism in accordance with claim 4 and characterized in that said means for driving the vehicle drive pump from said first intermediate gear comprise a further intermediate gear fixed to said first intermediate shaft for rotation together therewith.

6. A hydro-mechanical change speed mechanism in accordance with claim 4 and characterized in that the first gear train in addition to the drive gear for the vehicle drive pump further comprises at least one idler gear meshing with this drive gear, said idler gear being driven from said first intermediate gear and in that at least the drive gear for the vehicle pump and the idler gear lie on a line subtending an angle ($\alpha$) in the range 20° to 70° with said central longitudinal plane.

7. A hydro-mechanical change speed mechanism in accordance with claim 6 and characterized in that said angle ($\alpha$) lies in the range from 30° to 60°.

8. A hydro-mechanical change speed mechanism in accordance with claim 6 and characterized in that said angle ($\alpha$) is substantially 45°.

9. A hydro-mechanical change speed mechanism in accordance with claim 4 and characterized in that said first intermediate shaft drives a drive pump for the associated apparatus said drive pump being connected by a flange to said housing.

10. A hydro-mechanical change speed mechanism in accordance with claim 4 and characterized in that said second gear train comprises a second transfer gear freely rotatably mounted about said output shaft, means for coupling said second transfer gear to said output shaft for rotation together therewith, a second intermediate gear meshing with said second transfer gear and supported on a second intermediate shaft for rotation together therewith and in that said second gear train further comprises means for driving said second intermediate gear from said hydraulic motor.

11. A hydro-mechanical change speed mechanism in accordance with claim 10 and characterized in that said means for driving said second intermediate gear from said hydraulic motor comprises a further intermediate gear supported on said second intermediate shaft for rotation together therewith.

12. A hydro-mechanical change speed mechanism in accordance with claim 10 and characterized in that said second intermediate shaft is axially aligned with said first intermediate shaft.

13. A hydro-mechanical change speed mechanism in accordance with claim 10 and characterized in that said means for driving said second intermediate gear from said hydraulic motor comprises, in addition to the said drive gear coupled to the hydraulic motor, a second idler gear meshing with the drive gear coupled to the hydraulic motor and in that said second idler gear and said drive gear coupled to said hydraulic motor lie along a line which subtends an angle ($\beta$) in the range from 20° to 70° with said central longitudinal plane.

14. A hydro-mechanical change speed mechanism in accordance with claim 13 and characterized in that said angle ($\beta$) lies in the range from 30° to 60°.

15. A hydro-mechanical change speed mechanism in accordance with claim 13 and characterized in that said angle ($\beta$) is substantially 45°.

16. A hydro-mechanical change speed mechanism in accordance with claim 13 and characterized in that the angle ($\beta$) equals the angle ($\alpha$) but lies on the opposite side of said central longitudinal plane.

17. A hydro-mechanical change speed mechanism in accordance with claim 13 and characterized in that, in said first gear train, the drive gear for said vehicle drive pump and the meshing idler gear respectively have the same tooth divisions as the drive gear coupled with said hydraulic motor and the meshing second idler gear of said second gear train.

18. A hydro-mechanical change speed mechanism in accordance with claim 1 and characterized in that the drive gear for the vehicle drive pump also drives a further pump for auxiliary equipment said further pump being flanged to the opposite side of said housing from, and coaxial with, said vehicle drive pump.

19. A hydro-mechanical change speed mechanism in accordance with claim 1, in which said output shaft is adapted to drive said vehicle wheels via intermediate drive members.

20. A hydro-mechanical change speed mechanism in accordance with claim 1, characterized in that said first and second gear trains include respective first and second transfer gears respectively freely rotatably mounted on said input and said output shafts, there being first and second coupling gears respectively coaxially fixed to said first and second transfer gears for rotation together therewith, said first and second coupling gears being axially aligned with respective input and output gears of the same diameter and the same tooth division, with said input and output gears being fixed to the input and output shafts respectively, being spaced apart by a small axial distance and respectively supporting axially displaceable first and second selector hubs, the first and second selector hubs having matching dogs on their end faces, the selector mechanism being operative to displace the selector hubs to respective first end positions for respectively coupling the input and output gears with the first and second coupling gears of the associated first and second transfer gears and to second end positions in which said matching dogs are engaged for effecting a driving connection between said input and output shafts.

21. A hydro-mechanical change speed mechanism in accordance with claim 20 and characterized in that said selector mechanism is adapted to jointly displace said first and second selector hubs to said first end positions and to said second end positions.

22. A hydro-mechanical change speed mechanism in accordance with claim 21 and characterized in that the first and second selector hubs are respectively pivotally connected to first and second actuating levers, said first and second actuating levers being pivotally connected to said housing and to one another such that they move of necessity in opposite directions.

23. A hydro-mechanical change speed mechanism in accordance with claim 22 and characterized in that one of said first and second actuating levers is rotationally connected to an actuating rod outside of the housing.

24. A hydro-mechanical change speed mechanism in accordance with claim 20 and characterized in that an abutment ring is arranged between said input and output gears and projects radially beyond these gears to form at its end faces respective abutments for the said first and second selector hubs but however allows the end face dogs of the said selector hubs to engage one another.

25. A hydro-mechanical change speed mechanism in accordance with claim 22 and characterized in that the actuating levers are constructed as selector forks embracing the selector hubs.

26. A hydro-mechanical change speed mechanism in accordance with claim 22 and characterized in that a releasable stop is provided for fixing the first and second actuating levers in their positions corresponding to the said first and second end positions of the first and second selector hubs and that the stop is operative when the input and output shafts are in rotation but is disengaged when the input and output shafts are stationary.

27. A hydro-mechanical change speed mechanism in accordance with claim 1, characterized in that said mechanism includes a gear housing containing said first and second gear trains and said housing comprises two substantially identical first and second housing halves which are placed together in opposition along a plane extending at right angles to the input and output shafts.

28. A hydro-mechanical change speed mechanism in accordance with claim 27 and characterized in that the said first and second housing halves are each symmetrically constructed with respect to the central longitudinal plane of the mechanism.

29. A hydro-mechanical change speed mechanism in accordance with claim 27 and characterized in that said first and second housing halves are of substantially identical construction in the vicinity of the input and output shafts to either side of the central longitudinal plane.

30. A hydro-mechanical change speed mechanism in accordance with claim 27 and characterized in that the first and second housing halves are constructed dissimilarly in the vicinity of the drives for the vehicle drive pump and the hydraulic motor such that the flange for the vehicle drive pump projects further forwards with respect to the axis of this pump than the flange for the hydraulic motor.

31. A hydro-mechanical change speed mechanism in accordance with claim 27 and characterized in that said first and second gear trains include respective first and second intermediate gears supported on respective first and second intermediate shafts for rotation together therewith, said first and second intermediate shafts being axially aligned with each other, that a bearing plate is provided to rotatably support the inner ends of said first and second intermediate shafts and that said bearing plate is adapted to be located between the housing halves.

32. A hydro-mechanical change speed mechanism in accordance with claim 31 and characterized in that said bearing plate is symmetrically constructed relative to the common rotational axis of said first and second intermediate shafts, is mounted on mounts within the two housing halves such that the bearing plate can be introduced into the open side of one of the housing halves and can be fastened thereto without preventing the fitting of the other of said housing halves.

* * * * *